US009656567B2

(12) United States Patent
Kothavale et al.

(10) Patent No.: US 9,656,567 B2
(45) Date of Patent: May 23, 2017

(54) ELECTRIC VEHICLE CHARGING STATION DYNAMICALLY RESPONDING TO POWER LIMIT MESSAGES BASED ON A RECENT HISTORY OF POWER PROVIDED

(71) Applicant: CHARGEPOINT, INC., Campbell, CA (US)

(72) Inventors: Shantanu R. Kothavale, Cupertino, CA (US); Milton T. Tormey, Los Altos, CA (US); James Solomon, Saratoga, CA (US); Danny Y. Lee, San Mateo, CA (US)

(73) Assignee: CHARGEPOINT, INC., Campbell, CA (US)

( * ) Notice: Subject to any disclaimer, the term of this patent is extended or adjusted under 35 U.S.C. 154(b) by 439 days.

(21) Appl. No.: 13/830,580

(22) Filed: Mar. 14, 2013

(65) Prior Publication Data

US 2014/0103866 A1    Apr. 17, 2014

Related U.S. Application Data

(60) Provisional application No. 61/611,540, filed on Mar. 15, 2012.

(51) Int. Cl.
*H02J 7/00* (2006.01)
*B60L 11/18* (2006.01)
(Continued)

(52) U.S. Cl.
CPC ............ *B60L 11/1844* (2013.01); *B60L 3/12* (2013.01); *B60L 11/1816* (2013.01);
(Continued)

(58) Field of Classification Search
CPC ........................ Y02T 90/14; B60L 11/1844
(Continued)

(56) References Cited

U.S. PATENT DOCUMENTS

| 5,793,211 A * | 8/1998 | Shimoyama | B60L 11/1851 320/106 |
| 5,926,004 A | 7/1999 | Henze | |

(Continued)

OTHER PUBLICATIONS

PCT Search Report for PCT/US2013/032587, mailed Jun. 14, 2013, 14 pages.

*Primary Examiner* — Drew A Dunn
*Assistant Examiner* — Zixuan Zhou
(74) *Attorney, Agent, or Firm* — Nicholson De Vos Webster & Elliot LLP

(57) ABSTRACT

An electric vehicle charging station charging electric vehicles dynamically responds to power limit messages. The charging station includes a charging port that is configured to electrically connect to an electric vehicle to provide power to charge that electric vehicle. The charging station also includes a power control unit coupled with the charging port, the power control unit configured to control an amount of power provided through the charging port. The charging station also includes a set of one or more charging station control modules that are configured to, in response to receipt of a message that indicates a request to limit an amount of power to an identified percentage and based on a history of power provided through the charging port over a period of time, cause the power control unit to limit the power provided through the charging port to the identified percentage.

20 Claims, 5 Drawing Sheets

(51) Int. Cl.
  *H02J 13/00*     (2006.01)
  *B60L 3/12*      (2006.01)
(52) U.S. Cl.
  CPC ....... *B60L 11/1824* (2013.01); *B60L 11/1846* (2013.01); *B60L 11/1848* (2013.01); *H02J 7/0027* (2013.01); *H02J 13/0006* (2013.01); *B60L 2230/16* (2013.01); *B60L 2240/547* (2013.01); *B60L 2240/549* (2013.01); *B60L 2240/70* (2013.01); *H02J 13/0024* (2013.01); *Y02E 60/721* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
  USPC ........................................................ 320/109
  See application file for complete search history.

(56) References Cited

U.S. PATENT DOCUMENTS

| | | | |
|---|---|---|---|
| 7,256,516 B2 * | 8/2007 | Buchanan et al. | 307/62 |
| 7,768,229 B2 | 8/2010 | Zhang et al. | |
| 2009/0138099 A1 | 5/2009 | Veillette | |
| 2010/0017249 A1 * | 1/2010 | Fincham | B60L 3/12 705/412 |
| 2011/0202418 A1 * | 8/2011 | Kempton et al. | 705/26.1 |
| 2013/0015707 A1 * | 1/2013 | Redmann | 307/39 |

* cited by examiner

ELECTRIC VEHICLE CHARGING STATION DYNAMICALLY RESPONDING TO POWER LIMIT MESSAGES BASED ON A RECENT HISTORY OF POWER PROVIDED

CROSS-REFERENCE TO RELATED APPLICATIONS

This application claims the benefit of U.S. Provisional Application No. 61/611,540, filed Mar. 15, 2012, which is hereby incorporated by reference

FIELD

Embodiments of the invention relate to the field of electric vehicle charging; and more specifically, to an electric vehicle charging station dynamically responding to power limit messages based on a recent history of power provided.

BACKGROUND

Demand response is a common way to manage power consumption in response to supply conditions. For example, customers may register as demand response customers with their local power utility to receive a reduced rate for their energy usage while allowing the power utility to reduce their load during periods of high demand.

Electric vehicle supply equipment (EVSE), commonly referred to as electric vehicle charging stations, are used to charge electric vehicles (e.g., electric battery powered vehicles, gasoline/electric battery powered vehicle hybrids, etc.). Some electric vehicle charging stations may include the ability to respond to demand response load control message to reduce load by turning off the charging station or a charging station port.

SUMMARY

An electric vehicle charging station charging electric vehicles dynamically responds to power limit messages. The charging station includes a charging port that is configured to electrically connect to an electric vehicle to provide power to charge that electric vehicle. The charging station also includes a power control unit coupled with the charging port, the power control unit configured to control an amount of power provided through the charging port. The charging station also includes a set of one or more charging station control modules that are configured to, in response to receipt of a message that indicates a request to limit an amount of power to an identified percentage and based on a history of power provided through the charging port over a period of time, cause the power control unit to limit the power provided through the charging port to the identified percentage.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
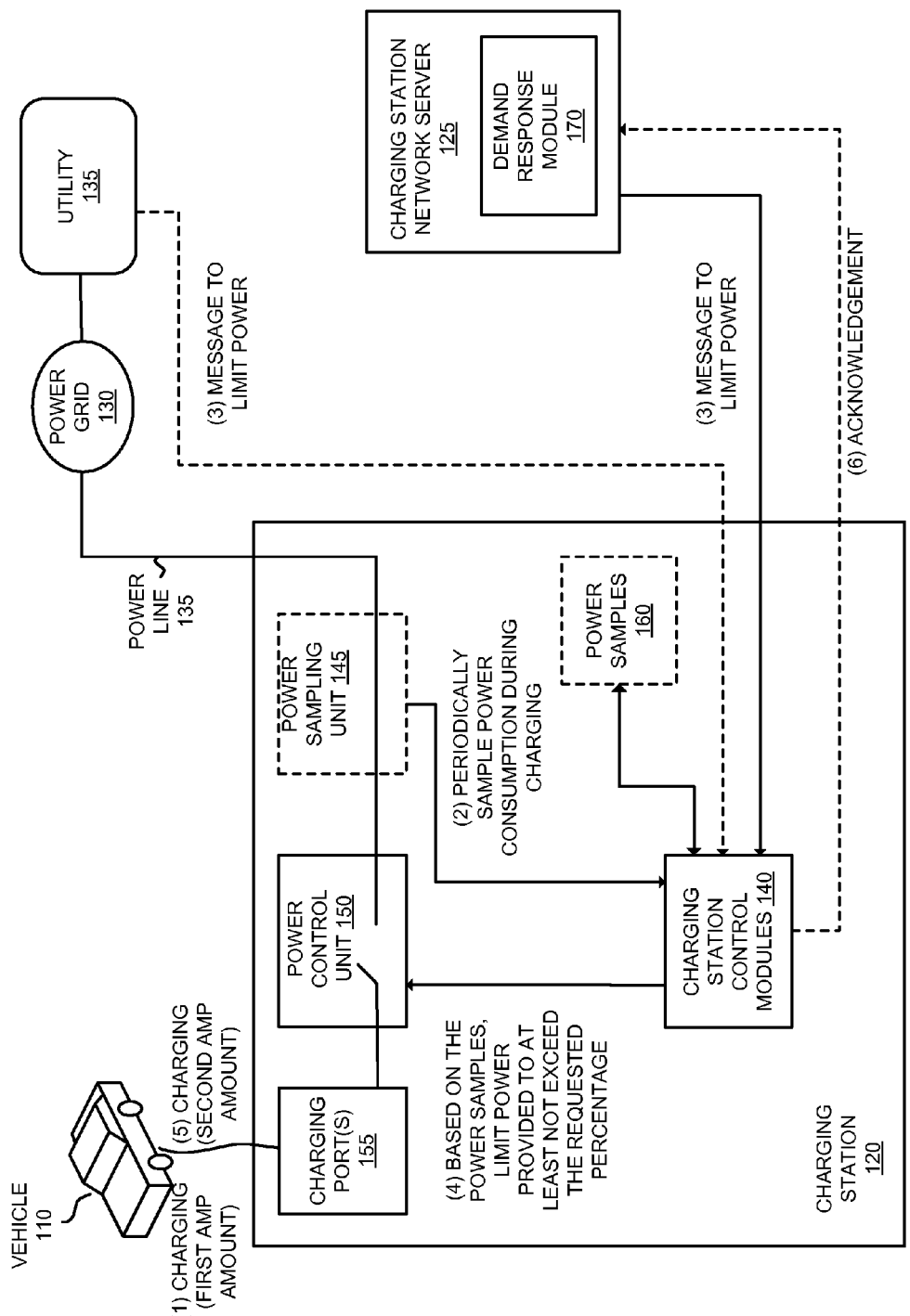
FIG. 1 illustrates an exemplary system for dynamically responding to power limit messages based on a recent history of power provided through the charging station according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. In the following description and claims, the term "coupled" along with its derivatives, may be used. "Coupled" is used to indicate that two or more elements, which may or may not be in direct physical or electrical contact with each other, co-operate or interact with each other.

A method and apparatus for an electric vehicle charging station ("charging station") dynamically responding to power limit messages based on a recent history of power provided through the charging station is described. In one embodiment, responsive to receiving a message that indicates a request to limit the amount of power to an identified percentage, the charging station limits the amount of power provided through a charging port to at least the identified percentage based on a recent history of power provided through that charging port over a defined period of time. In one embodiment, the message is sent as part of a demand response event, and is a demand response load control message.

In one embodiment, the charging station or another device that is capable of monitoring the amount of power being drawn through the charging station, periodically samples the power being dispensed through the charging port(s) of the charging station (e.g., a sample every 60 seconds), and stores a predefined number of the latest samples (e.g., a buffer of ten samples). By way of a specific example, storage is allocated for a predefined number of samples (e.g., 10). Once that number of samples has been taken, the next sample pushes the oldest sample out. Each sample may also include the time elapsed between that sample and the previous sample, as the time between samples may vary (referred herein as the duration). Responsive to a power limit message being received that indicates a request to limit the power being dispensed to a certain percentage, the charging station (or another device that is sampling the power) determines the amount of power that will subsequently be allowed to be drawn through one or more of its charging ports(s) based on the most recent samples (e.g., the samples in the buffer) and the requested percentage. The charging station then causes the amount of power that is capable of being drawn to be set according to the determined value.

In one embodiment, if the determined value is below a threshold (e.g., less than 6 amps), then no amount of power will be allowed to be drawn through the charging station during a power limiting event. As an example, if the power samples indicate that there has not been power recently drawn through the charging station (e.g., the charging station is idle), then no power will be dispensed through the charging station during the power limiting event.

In one embodiment, the recent history of power provided through the charging station is based on the average of the stored power samples. In another embodiment, the recent history of power provided through the charging station is based on the maximum of the stored power samples. In another embodiment, the value of the recent history of power provided through the charging station is calculated as the sum of the product of the current samples and their duration, divided by the total sample duration.

FIG. 1 illustrates an exemplary system for dynamically responding to power limit messages based on a recent history of power provided through the charging station according to one embodiment. The charging station 120 is used to charge electric vehicles (e.g., electric battery powered vehicles, gasoline/electric battery powered vehicle hybrids, etc.). The charging station 120 may be located in a designated charging location (e.g., similar to a gas station), near parking spaces (e.g., public parking spaces and/or private parking spaces), private residences, etc. The charging station 120 may be controlled (e.g., owned or leased) by governments, businesses, utilities, organizations, residential customers, or other entities. As illustrated in FIG. 1, the charging station 120 supplies power through the power line 135 via the power grid 130, which is operated by the utility 135. Although FIG. 1 illustrates a power grid operating a utility supplying power to the charging station, embodiments are not so limited as different power sources may be supplying power to the charging station (e.g., a solar array). In some embodiments, which will be described in greater detail later herein, the utility 135 issues demand response load control messages during demand response events.

The charging station 120 includes one or more charging ports 155, each of which may provide a connection point to an electric vehicle for charging. For example, the charging port(s) 155 may include connections and circuitry for attached charging cords (e.g., with a connector conforming to SAE Electric Vehicle and Plug in Hybrid Electric Vehicle Conductive Charge Coupler, J1772 Proposed Draft, November 2009 ("SAE J1772")) for charging electric vehicles. The charging port(s) 155 may include standard power receptacles (e.g., conforming to NEMA (National Electrical Manufacturers Association) standards 5-15, 5-20, 14-50 or other standards (e.g., BS 1363, CEE7, etc.) and may operate at different voltages (e.g., 120V, 240V, 230V, etc.)). The charging port(s) 155 may be capable of supporting DC charging. The charging port(s) 155 may include circuitry for inductively charging electric vehicles.

The charging station 120 is coupled with the charging station network server 125 (hereinafter "server"). The charging station 120 may be coupled with the server 140 over a Wide Area Network (WAN) such as the Internet, over a Local Area Network (LAN), and/or through a charging station gateway and/or payment station (not illustrated) that may relay communication between the charging station 120 and the server 125. The charging station gateway may in itself provide charging service. The server 125 may be owned and administered by a network operator (not illustrated) and may be a different entity than who owns or controls the charging station 120. As will be described in greater detail later herein, the server 125 may issue power limit messages (such as demand response load control messages) to the charging station 120.

The charging station 120 may periodically send the amount of power being consumed by an electric vehicle to the server 125. This data may be used by the utility or other entity when determining how much to shed from the load.

Although FIG. 1 illustrates a single charging station coupled with the server 125, it should be understood that typically multiple charging stations are coupled with the server 125 and communicate with the server 125. For example, the server 125 may maintain station identification information and communication information such that it can transmit messages to each of the charging stations. The server 125 may also include information on established charging sessions such as electric vehicle operator identification information, and electric vehicle operator preferences. As will be described in greater detail later herein, in some embodiments, electric vehicle operators may opt-out of the demand response service such that demand response events will not affect their charging (typically for a higher rate).

Operators of electric vehicles may be required to be authorized in order to use a particular charging station and/or charging port. In one embodiment, operators request charging sessions, where each request includes an access identifier. In one embodiment, the access identifier is included in an RFID enabled device that is assigned to an electric vehicle operator. The operator may swipe/wave the RFID enabled device near an RFID reader of the charging station (or a gateway and/or payment station coupled with charging station) to present the access identifier and request the charging session. In another embodiment, operators request charging sessions and provide an access identifier (e.g., username/password, email address, phone number, PIN, account number, etc.) in which the operator may enter into a user interface provided on the charging station, payment station coupled with the charging station, and/or through a web interface (e.g., on a mobile app). In one embodiment, the charging station (or a gateway or payment station coupled with the charging station) transmits the request to the server 125 for authorization. The authorization request transmitted to the server 125 includes the access identifier and may also include an identifier of the charging station that uniquely identifies the charging station. In another embodiment, the authorization is performed locally on the charging station 120.

The charging station 120 includes a power control unit 150 that controls the amount of power that can be drawn by an electric vehicle through one of the charging port(s) 155. In some embodiments, the power control unit 150 is a solid state device or any other device suitable for controlling the flow of electricity that can energize or de-energize a charging port and/or variably control the amount of current that can be drawn through a charging port. The power control unit 150 may also be used to signal the maximum available current capacity through a charging port to an electric vehicle (e.g., through Pulse Width Modulation (PWM) circuitry). In some embodiments, the power control unit 150 is controlled by instructions from the charging station control modules 140. For example, as will be described in greater detail later herein, in response to receiving a power limit message to limit the amount of power consumption, the charging station control modules 140 may instruct the power control unit 150 to modify the amount of current that can be drawn through a charging port based on the recent history of power provided through that charging port. In some embodiments there is a separate power control unit 150 for each of the charging port(s) 155.

The charging station 120 may also include the power sampling unit 145 that samples the power being dispensed through a charging port. The power sampling unit 145 may be a meter or any other device that can measure current or power. The power sampling unit 145 may periodically take power samples, each power sample indicating an amount of power presently being dispensed through the sampled charging port. By way of example, the power sampling unit 145 may sample every 60 seconds (or other defined time, which may be configurable) each having a duration of 1 second (or other defined time, which may be configurable).

The power sampling unit 145 may take samples according to instructions from the charging station control modules 140 according to one embodiment. In one embodiment, samples are only taken while charging is ongoing (that is, an electric vehicle is connected to the charging station) and there is not a power limiting event such as a demand response event. The charging station control modules 140 cause the power samples to be stored in the power samples storage 160, which in some embodiments is non-volatile memory. In one embodiment, a sliding window of power samples is buffered in the power samples storage for an ongoing charging session (e.g., the last ten power samples of an ongoing charging session). When a charging session ends and there is not a power limiting event, the buffered power samples for that charging session may be removed.

While FIG. 1 illustrates that the power sampling unit 145 and power samples 160 are part of the charging station 120, embodiments are not so limited. For example, power samples may be taken by devices external to the charging station 120 that are capable of measuring the power dispensed by the charging station 120 to the electric vehicle 110, and stored/buffered in those devices. As another example, the charging station 120 may transmit the power samples to an external entity (e.g., the server 125, a gateway unit, etc.) that may use them to calculate the recent history of power provided.

As illustrated in FIG. 1, at an operation 1, the electric vehicle 110 is charging through one of the charging port(s) 155 and drawing a first amount of current (first amp amount). In this example, the electric vehicle 110 is initially being charged while not being subject to a power limiting event such as a demand response event.

At an operation 2, the charging station control modules 140 cause the power sampling unit 145 to periodically sample the power that is being dispensed to the electric vehicle 110 (e.g., a sample of 60 seconds), and store the samples in the power samples 160 (e.g., a buffer of most recent samples). The charging station control modules 140 may transmit the power samples to an external entity (e.g., the server 125, a gateway unit, etc.).

Sometime later, at an operation 3, the charging station 120 receives a message that indicates it should limit power consumption to a certain percentage (e.g., reduce to X %). The message may be sent from the utility 135, the charging station network server 125, or from another entity.

By way of a specific example, the charging station network server 125 includes a demand response module 170 that allows a utility, a charging station owner, or other entity to cause a demand response load control message to be sent to the charging station 120 as well as potentially other charging stations that are to be affected by a demand response event. For example, due to strain on the power grid 130, an employee at the utility 135 may determine to reduce the load of the charging stations on the power grid 130 (including the charging station 120) to a certain percentage (e.g., reduce the load to 75%). The utility employee may use the demand response module 170 to cause a message to be sent to the charging stations on the power grid 130 to reduce their load to at least 75%. The demand response module 170 may also be used to select certain charging stations (e.g., a portion of the stations on the power grid 130) in which to effect a demand response event. In one embodiment, the demand response module 170 allows the configuration of demand response triggers to automatically respond to demand response events, which may or may not take as input other non-charging station load on the power grid.

In some embodiments, operators of electric vehicles may opt-out of being affected by demand response events or other power limiting events. In such an embodiment, prior to transmitting a power limit message to a charging station to be applied to a charging port, the server 125 determines whether there is an active charging session on that charging port. If there is, the server 125 then determines whether the power limit event is applicable to the operator associated with that charging session. This may be determined, for example, based on the access identifier that may be presented when requesting the charging session. If the power limiting event is not applicable to the operator, then a power limit message will not be sent for that port (at least until that charging session has terminated). If the power limit event is applicable, then a power limit message may be sent for that port. In addition, if a charging station has already limited the power that can be drawn through a charging port due to a power limit event when an operator requests a charging session, the server 125 may determine whether that operator has opted-out of that event. For example, the operator may opt-out of demand response events. If so, then the server 125 may send a message to the charging station to remove the limit on the power for that port, at least until that charging session is terminated.

At operation 4, the charging station 120 limits the power that it will provide to at least not exceed the requested percentage of the recent history of power provided. In one embodiment, the charging station control modules 140 calculate the recent history of power provided though the charging port 155 connecting the electric vehicle 110 and the charging station 110 based on the power samples 160 stored for that charging session. The calculation may be based on the average of the stored power samples 160. For example, the value of the recent history of power provided may be calculated as the sum of the product of the samples and their duration, divided by the total sample duration. Alternatively, the calculation may be based on the maximum of the stored power samples 160. In an alternative embodiment, an entity external to the charging station 120 computes the recent history of power provided. For example, the server 125, a gateway unit, or any other application that can access the power samples (whether the power samples are stored on the charging station 120 and/or a different device), may calculate the recent history of power provided. The external entity may transmit to the charging station 120 the calculated recent history of power provided.

Based on the recent history of power provided, the charging station control modules 140 limit the power provided through the charging port according to the requested percentage received in operation 3. By way of example, if the recent history of power provided through the charging port 155 is 16 amps and the message indicates to limit the load to 75%, the charging station control modules 140 cause the energy control unit 150 to limit the power provided through the charging port 155 to 12 amps.

In one embodiment, the energy control unit 150 signals the electric vehicle 110 (e.g., through PWM circuitry) its modified current capacity through the charging port 155 (e.g., 12 amps in the example above). If the electric vehicle 110 does not respect the signaling (e.g., does not limit its power consumption to the signaled amount), the charging station 120 may terminate the charging session and prevent further charging from the vehicle 110 (at least during the power limit event or until a future modification raises the limit sufficiently). In another embodiment, the energy control unit 150 imposes the voltage and current that can be delivered to the electric vehicle 110 through the charging port 155.

Some charging implementations, such as those implementing SAE J1772, have a minimum power value for charging. For example, implementations conforming to SAE J1772 do not charge under 6 amps. In some embodiments, if the limit is determined to be lower than the minimum value, then the charging station control modules 140 cause the energy control unit 150 to de-energize the charging port 155 thereby preventing power from being delivered.

After the energy control unit 150 causes the power provided to be limited, at operation 5, the electric vehicle 110 is limited to drawing power according to that limit (of course, the electric vehicle 110 may draw power below that limit) The charging station 120 may, at operation 6, transmit an acknowledgement to the server 125 (or the other entity that sent the message in operation 3) that indicates that the power provided has been limited as requested. In one embodiment, if the server 125 (or the other entity that sent the message) does not receive an acknowledgment, then other charging stations whose power provided was limited may need to be limited further in order to reduce the load by the desired amount.

It should be understood that the electric vehicle 110 will be limited to drawing power according to the modification until the power limiting event is finished. In one embodiment, other electric vehicles that use the same port after the electric vehicle 110 will also be subject to the modified power limit while the power limiting event exists.

A power limiting event, such as a demand response event, may terminate in a number of ways. For example, the power limiting event may exist for a defined period of time (e.g., one hour), the expiration of which causes the power limit to be automatically removed. As another example, the charging station 120 may receive a message from the server 125 that indicates that the power limiting event has terminated, and respond by causing the power limit to be removed.

Figure 2:
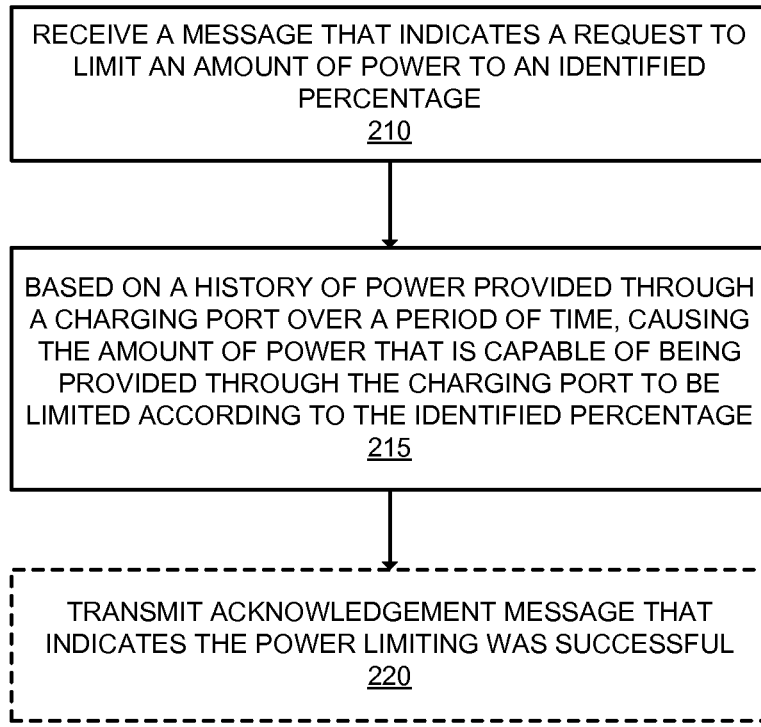
FIG. 2 is a flow diagram illustrating exemplary operations for an electric vehicle charging station dynamically responding to power limit messages based on a recent history of power provided through the charging station according to one embodiment.

FIG. 2 is a flow diagram illustrating exemplary operations for an electric vehicle charging station dynamically responding to power limit messages based on a recent history of power provided through the charging station according to one embodiment.

At operation 210, the charging station receives a message that indicates a request to limit an amount of power to an identified percentage. The message may be sent as a result of a demand response event, and may be a demand response load control message. The message may be applicable to one or more charging ports of the charging station. However, for the purposes of FIG. 2, a single charging port will be described. The message may be sent by a utility controlling the power grid servicing the charging station, a charging station network server, or from another device such as a demand response automation server (DRAS). A DRAS typically receives a demand response signal from utility software, and forwards that message to participating entities, which may include charging stations, or an aggregator such as the charging station network server.

Flow moves from operation 210 to operation 215, where the charging station, based on a history of power provided through the charging port over a period of time, causes the amount of power that is capable of being provided through the charging port to be limited according to the identified percentage.

By way of example, the average amperage over the period of time is calculated and that average is used when limiting to at least the requested percentage. As a specific example, if the average amperage over the period of time is 32 amps and the message indicates to limit the load to 25%, then the charging station causes the amps that can be drawn through the charging port to be limited to not exceed 8 amps. Of course the average amperage is an example, and other mechanisms may be used to calculate the history of power provided.

As another specific example, if there is not a recent history of power provided through the charging port at the time the message is received (e.g., there are no power samples because that port was idle), then regardless of the specific percentage requested, the charging station causes no power to be drawn through the charging port (at least until the power limit event terminates).

In another embodiment, an entity external to the charging station (e.g., a gateway device, the charging station network server, etc.) calculates the recent history of power provided through the charging port, and communicates this information to the charging station.

Flow then moves to operation 220, where the charging station may optionally transmit an acknowledgement to the entity that sent the message in operation 210, the acknowledgement indicating that the power limiting was successful. For example, the acknowledgement may indicate the power limit that was set (e.g., the power has been reduced to 12 amps in this example). The charging station may continue to transmit messages to the server 125 on a regular basis that contain measures of the power presently being delivered and the accumulated energy that has been delivered to date during a charging session. This information may be used to verify that the power limiting action has successfully taken place.

Figure 3:
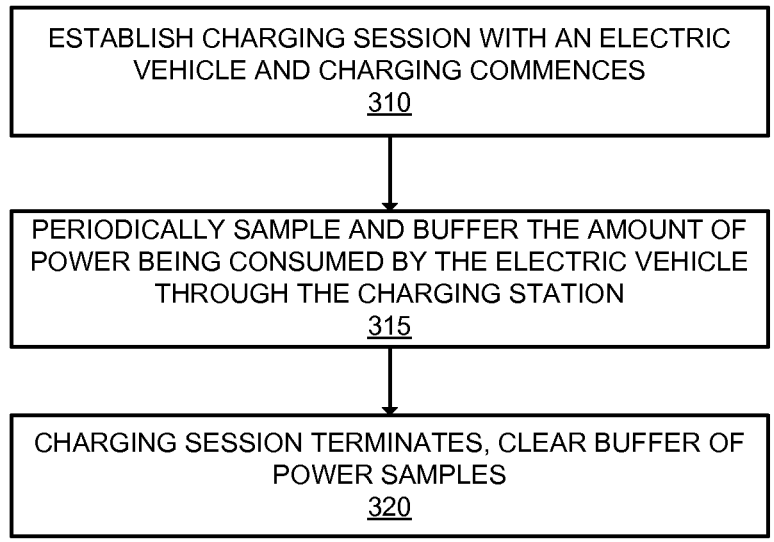
FIG. 3 is a flow diagram illustrating exemplary operations for sampling power according to one embodiment.

FIG. 3 is a flow diagram illustrating exemplary operations for sampling power according to one embodiment. At operation 310, a charging session is established between an electric vehicle and a charging station and charging commences. Flow then moves to operation 315, and the charging station periodically samples and buffers the amount of power being consumed by the electric vehicle through the charging station. By way of a specific example, storage is allocated for a predefined number of samples (e.g., 10). Once that number of samples has been taken, the next sample pushes the oldest sample out. Each sample may also include the time elapsed between that sample and the previous sample, as the time between samples may vary (referred herein as the duration).

Flow then moves to operation 320, where responsive to the charging session terminating and charging ceasing, the charging station clears the buffer of power samples. Although not illustrated in FIG. 3, if a power limit message such as a demand response load control message is received at the charging station prior to the charging session terminating, the charging station will not remove the buffer of power samples that exist at the time the message is received, in one embodiment, as these will be used when calculating the recent history of power provided.

Multiple Power Limit Messages

In some situations, multiple power limit messages may be received at a charging station during a power limiting event. For example, a first message requesting a reduction to 50%, followed by a second message requesting a reduction to 75%. The following examples provided in FIGS. 4 and 5 describe a demand response event, but may be applicable to other types of power limiting events.

In one embodiment, the charging station interprets multiple demand response load control messages (that are part of the same demand response event) independently and separately, and modifies the power limit based on the power samples existing when the first one of the multiple demand response load control message is received. In this embodiment, power samples are taken only when a demand response event does not exist (samples are not taken when a demand response event exists).

Figure 4:
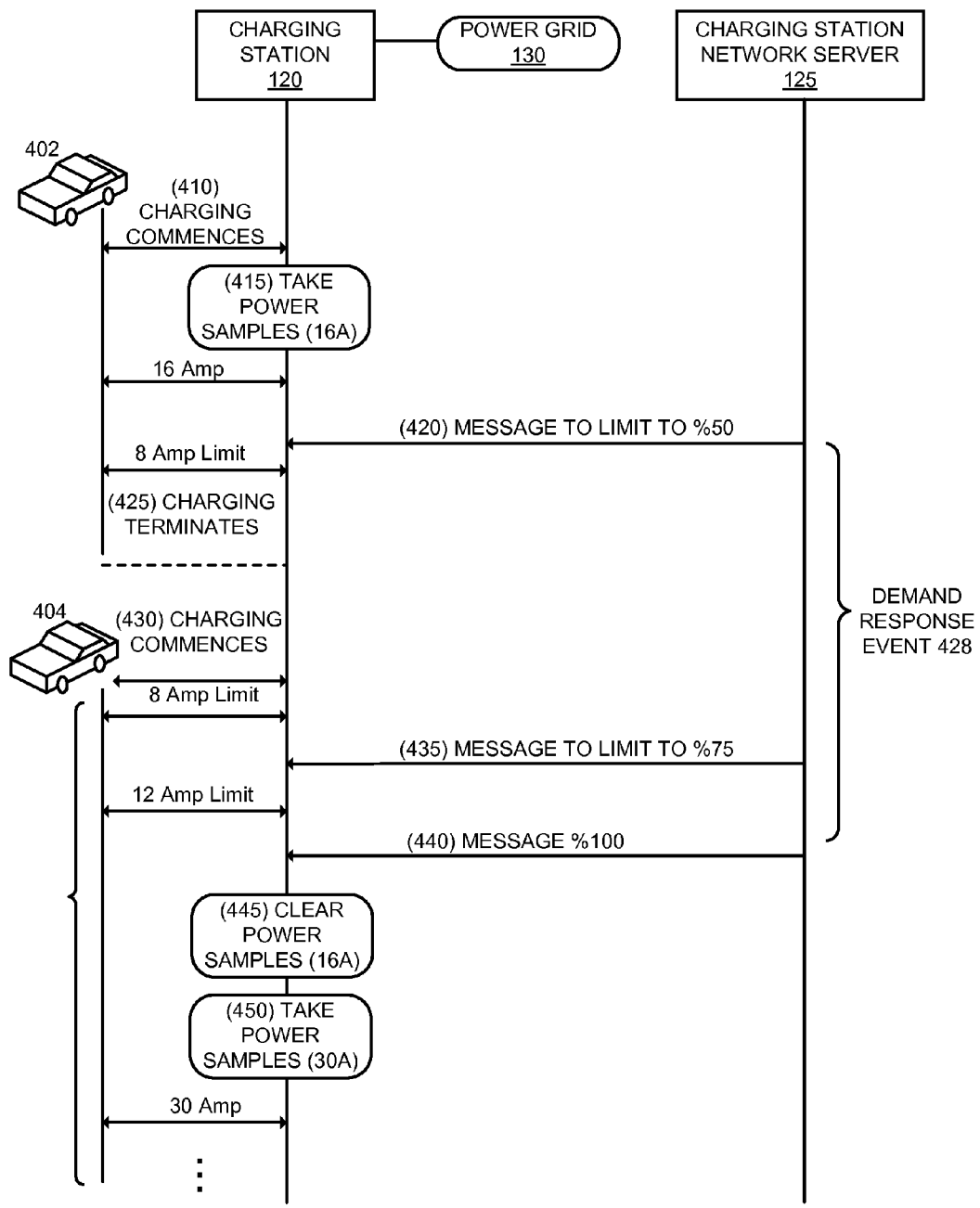
FIG. 4 illustrates an example where there are multiple demand response load control messages being received during the same demand response event (without the demand response event being cleared) and the charging station interprets them independently and separately according to one embodiment.

FIG. 4 illustrates an example where there are multiple demand response load control messages being received during the same demand response event (without the demand response event being cleared) and the charging station interprets them independently and separately. At operation 410, charging commences between the electric vehicle 402 and the charging station 120, which is drawing power from the power grid 130 through the charging station 120. The charging station 120 samples the power presently being consumed by the vehicle 402 at operation 415, which for purposes of this example is 16 amps. The power samples may be stored in the power sample storage 160. Sometime later, at operation 420, the charging station 120 receives a message to limit the power to 50%, sent by the server 125 (of course, the message may be sent by another entity as previously described). The message indicates the start of the demand response event 428. The charging station then causes the power that can be drawn to be limited to 8 amps. Sometime later, at operation 425, charging terminates (e.g., the operator disconnects the vehicle 402 from the charging station 120). It should be understood that in this example, the power samples that existed at the time the power limit message is received, which indicate a power of 16 amps, are not removed while the demand response event exists.

Sometime later, at operation 430, charging commences between the electric vehicle 404 and the charging station 120. It should be noted that the power samples are not taken at this time since the charging station 120 is in a demand response event. Also, since the charging station 120 is still in a demand response event, the electric vehicle 404 is limited to charging at 8 amps. Sometime later, at operation 435, the charging station 120 receives a message to limit the power it delivers to 75%. In this embodiment, the charging station 120 modifies the power limit based on the power samples existing when the first demand response load control message is received. Thus, the charging station 120 uses the power samples collected in operation 415 (which indicate 16 amps) when modifying its power limit. As a result, the charging station 120 causes the power that can be drawn to be limited to 12 amps.

Sometime later, at operation 440 the charging station 120 receives a message that clears the demand response event 420. For example, the message may be a demand response load control message indicating the charging station 120 can supply 100% of its rating (it is not limited). This represents the end of the demand response event 428. Since the demand response event 428 has ended, the charging station 120 clears the power samples it has taken (which indicated 16 amps) at operation 445, and begins to take new power samples at operation 450, which in this example indicate the vehicle 404 is charging at 30 amps.

In another embodiment, the charging station interprets multiple demand response load control messages progressively (dependent on the previous message). In this embodiment, power samples are taken both when a demand response event does not exist and when a demand response event exists.

Figure 5:
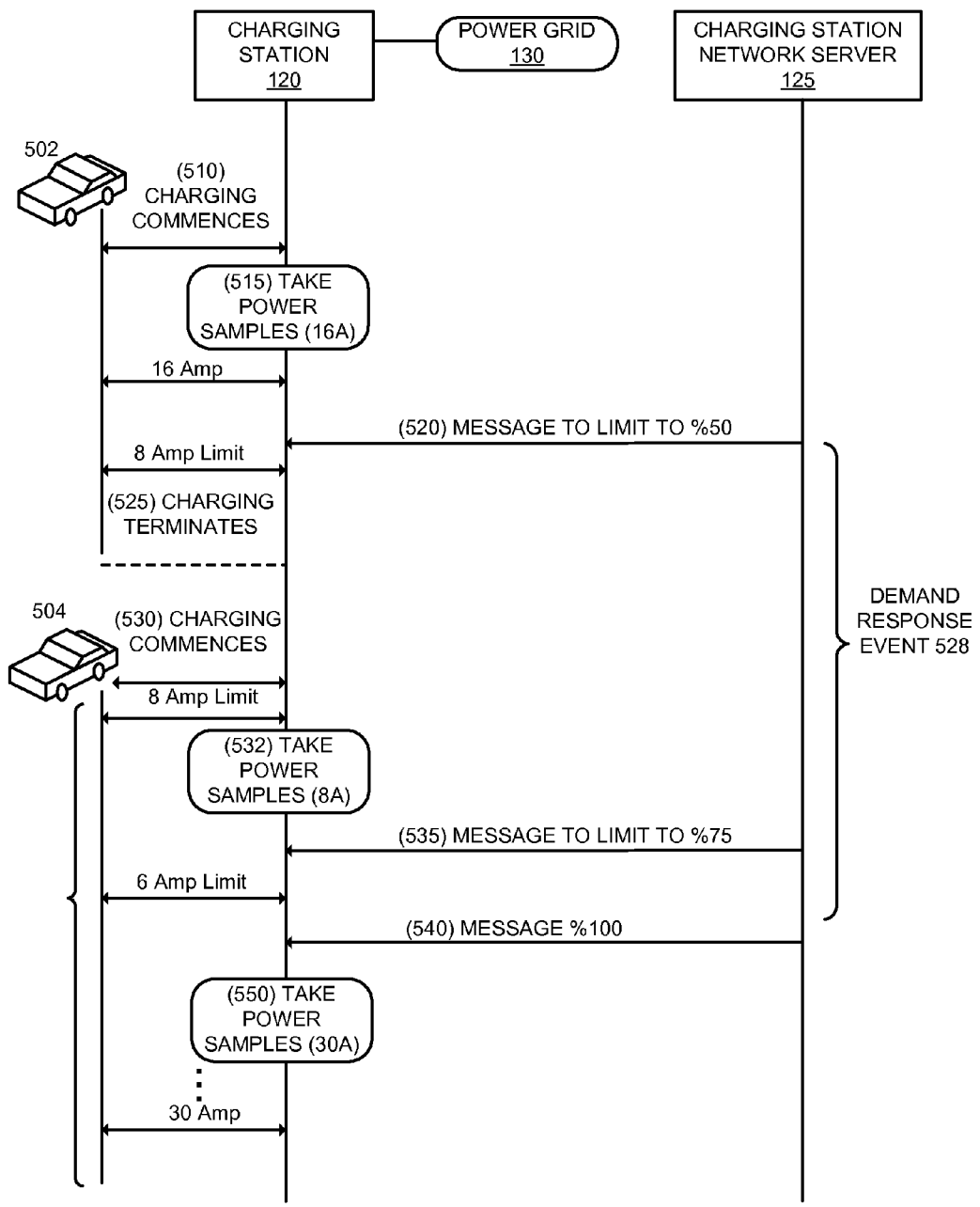
FIG. 5 illustrates an example where there are multiple demand response load control messages being received during the same demand response event (without the demand response event being cleared) and the charging station interpreting them progressively according to one embodiment.

FIG. 5 illustrates an example where there are multiple demand response load control messages being received during the same demand response event (without the demand response event being cleared) and the charging station interpreting them progressively. At operation 510, charging commences between the electric vehicle 502 and the charging station 120. The charging station 120 samples the power presently being consumed by the vehicle 502 at operation 515, which for this example is 16 amps (the same as in FIG. 4). The power samples may be stored in the power sample storage 160. Sometime later, at operation 520, the charging station 120 receives a message to limit the power to 50%, sent by the server 125 (of course, the message may be sent by another entity as previously described). The message indicates the start of the demand response event 528. The charging station then causes the power that can be drawn to be limited to 8 amps. Sometime later, at operation 525, charging terminates (e.g., the operator disconnects the vehicle 502 from the charging station 120).

Sometime later, at operation 530, charging commences between the electric vehicle 504 and the charging station 120. It should be noted that, unlike the example illustrated in FIG. 4, power samples are taken during a demand response event in this embodiment. Thus, at operation 532, the charging station samples the power presently being consumed by the vehicle 504. However, since the charging station has already limited its power to 8 amps, the samples will not exceed 8 amps. In this example, the power samples that are taken indicate that the vehicle 504 is charging at 8 amps. Sometime later, at operation 535, the charging station 120 receives a message to limit the power to 75%. In this embodiment, the charging station 120 modifies the power limit based on the latest power samples, which in this case 8 amps. As a result, the charging station 120 causes the power that can be drawn to be limited to 6 amps.

Sometime later, at operation 540 the charging station 120 receives a message that clears the demand response event 520. For example, the message may be a demand response load control message indicating the charging station 120 can supply 100% of its rating (it is not limited). This represents the end of the demand response event 528. The charging station then removes its power limit and continues to take power samples at operation 550, which indicate the vehicle 504 is charging at 30 amps.

As described above, some electric vehicle charging stations may include multiple charging ports (referred herein as a "multi-port charging station"). In some embodiments that are described above, the charging station treats each charging port independently. That is, the limit of power provided through each charging port is independently determined based on the recent history of power provided for that individual charging port (not taking into consideration the recent history of power provided through other charging ports).

In other embodiments, a multi-port charging station treats multiple ones of its charging ports as a group, and the limit of power provided through a particular charging port is based, at least in part, on the recent history of power provided through the aggregate of the group of charging ports. In these embodiments, responsive to receiving a message that indicates a request to limit the amount of power to an identified percentage and based on the recent history of power provided through the aggregate of the group of charging ports, the multi-port charging station may manage a budget of power that it can supply and allocate to those charging ports, while not exceeding the identified percentage. By way of example, if a charging station includes two charging ports, each of which is presently supplying 15 amps (for an aggregate total of 30 amps) and a message is received to limit to 50%, the charging station may manage the allocation of the 15 amps between those ports.

As one example, the power allocation may be "fair" where each charging port receives the same allocation (in this example 7.5 amps). As another example, the power allocation may be based on a policy based on one or more factors such as operator preferences (e.g., whether the operator is part of a preferred program), the state of charge of the vehicles connected to the ports (e.g., ports with vehicles that are relatively more charged or fully charged may receive an allocation less than ports with vehicles that are relatively less charged or not fully charged), the type of electric vehicles connected to the ports (e.g., ports that are connected to fully electric battery powered vehicles may be allocated more power than ports that are connected to gasoline/electric battery powered hybrid vehicles), the duration of the charging sessions (e.g., ports with vehicles that have been charging for a relatively longer period of time may be allocated less power than ports with vehicles that have been charging for a shorter period of time), the amount of power that has been delivered to the vehicles (e.g., ports with vehicles that have been supplied relatively larger amounts of power may be allocated less power than ports with vehicles that have been supplied a smaller amount of power), etc.

The power allocation may be dynamic and change. For example, if a charging session ends (e.g., a vehicle operator disconnects the vehicle from the charging station), the charging station may re-allocate the power across the charging ports.

Charging stations may be part of the same logical group and/or radio group. A radio group is a collection of one or more charging stations that collectively have a single connection to the charging station network server, which is provided through a gateway unit, which may be included in one of the charging stations in that radio group. The gateway unit, or other controller, may manage the charging station members of the radio group. A logical group is a collection of one or more charging stations that may or may not be part of the same radio group, and may be geographically distributed. The charging stations that are members of a logical group are often configured by a system administrator or the owner of those charging stations. In one embodiment, the charging station network server allows administrators, owners, or other authorized entities to define logical groups including its members. The server, or another device that is coupled with the stations, may manage the members of the logical groups.

In some embodiments, the power limiting is provided at a charging station group level (e.g., a radio group, a logical group). For example, the limit of power provided through a charging station or charging port may be based, at least in part, on the recent history of power provided through the aggregate of the charging stations or charging ports. For example, the charging stations may periodically transmit the power samples to the charging station network server, which maintains and can aggregate the values for calculating the recent history of power provided through a group of charging stations. In these embodiments, the controller of a group (e.g., a gateway unit, the server) may receive a request to limit the amount of power to an identified percentage, and based on the recent history of power provided through the aggregate of the group, and allocate power across the members of the group, while not exceeding the identified percentage. For example, after determining the allocations of power, the controller (e.g., the server, the gateway unit) may transmit messages to the charging stations in the group to apply the allocations.

Similarly as in the multi-port charging stations, there are different ways to determine how to allocate the power. For example, the power allocation may be "fair" where each member of the group receives the same allocation. As another example, the power allocation may be based on a policy based on one or more factors such as operator preferences, the state of charge of the vehicles connected to the ports, the type of electric vehicles connected to the ports, the duration of the charging sessions, the amount of power that has been delivered to the vehicles, etc.

Figure 6:
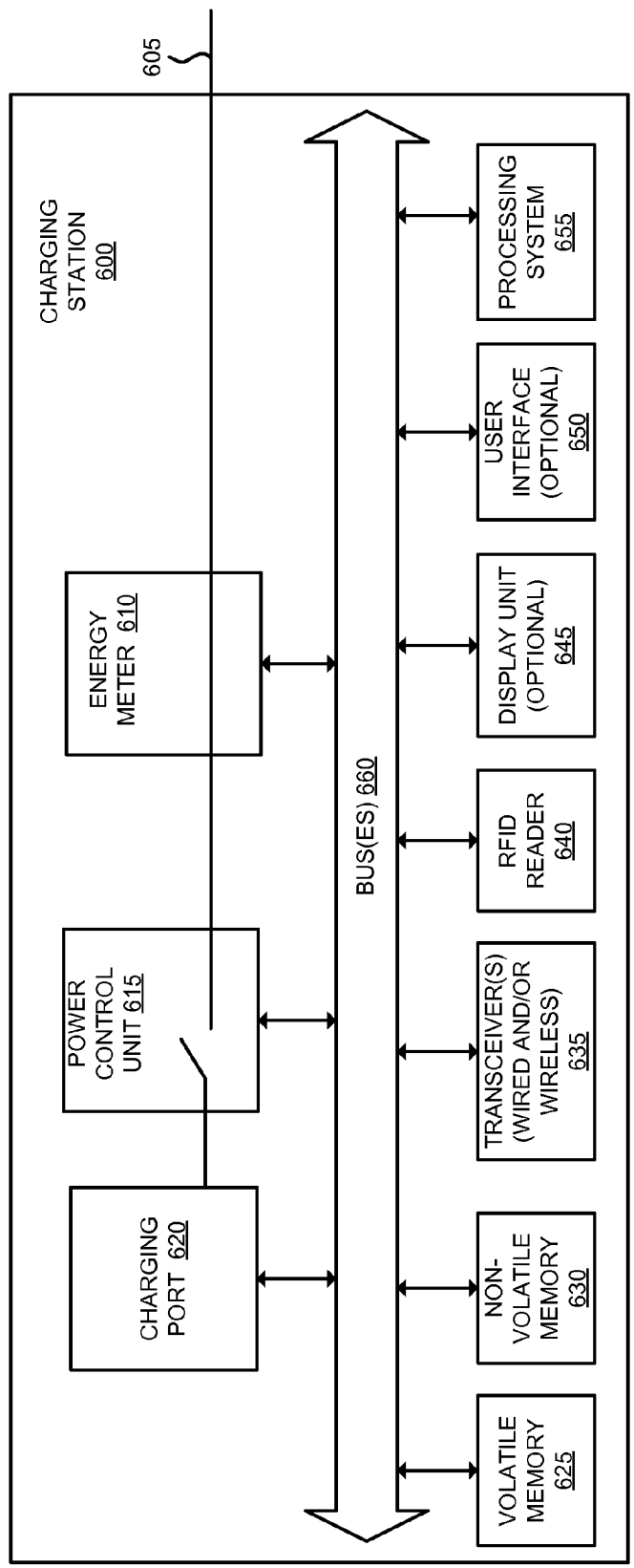
FIG. 6 illustrates an exemplary embodiment of a charging station according to one embodiment of the invention.

FIG. 6 illustrates an exemplary embodiment of a charging station according to one embodiment of the invention. It should be understood that FIG. 6 illustrates an exemplary architecture of a charging station, and other, different architectures may be used in embodiments of the invention described herein. For example, one or more of the components illustrated in FIG. 6 may not be included in some embodiments.

As illustrated in FIG. 6, the charging station 600 includes the energy meter 610, the power control unit 615, the charging port 620, the volatile memory 625, the non-volatile memory 630 (e.g., hard drive, flash, PCM, etc.), one or more transceiver(s) 635 (e.g., wired transceiver(s) such as Ethernet, power line communication (PLC), etc., and/or wireless transceiver(s) such as 802.15.4 transceivers (e.g., ZigBee, etc.), Bluetooth, WiFi, Infrared, GPRS/GSM, CDMA, etc.), the RFID reader 640, the display unit 645, the user interface 650, and the processing system 655 (e.g., one or more microprocessors and/or a system on an integrated circuit), which are coupled with one or more buses 660.

The energy meter 610 measures the amount of electricity that is flowing on the power line 605 through the charging connection 620. While in one embodiment of the invention the energy meter 610 measures current flow, in an alternative embodiment of the invention the energy meter 610 measures power draw. The energy meter 610 may be an induction coil or other devices suitable for measuring electricity. The energy meter 610 may be used to take power samples, as previously described.

The RFID reader 640 reads RFID tags from RFID enabled devices (e.g., smartcards, key fobs, contactless credit cards, etc.), embedded with RFID tag(s) of operators that want to use the charging station 600. For example, in some embodiments a vehicle operator can wave/swipe an RFID enabled device near the RFID reader 630 to request a charging session with the charging station 600. It should be understood, however, that charging sessions may be requested in different ways and access identifiers may be presented to the charging station in different ways. For example, in some embodiments the electric vehicles communicate an access identifier (e.g., their VIN) to the charging station through a protocol (e.g., PLC). In such embodiments, the electric vehicle operator may not be required to present an access identifier (such as the RFID enabled device) to gain access to the charging station.

The transceiver(s) 635 transmit and receive messages. For example, the transceiver(s) 635 transmit authorization requests to the server, receive authorization replies from the server, transmit charging session data to the server, etc. The transceiver(s) 635 may also receive power limit messages as described herein.

The display unit 645 is used to display messages to vehicle operators including the price(s) for charging service, current cost for charging service, charging status, confirmation messages, error messages, notification messages, etc. The display unit 645 may also display parking information if the charging station 600 is also acting as a parking meter (e.g., amount of time remaining in minutes, parking violation, etc.).

The user interface 640 (which is optional) allows users to interact with the charging station 600. By way of example, the user interface 650 allows electric vehicle operators to request charging sessions, pay for charging sessions, enter in account and/or payment information, etc.

The processing system 655 may retrieve instruction(s) from the volatile memory 325 and/or the nonvolatile memory 630, and execute the instructions to perform operations as described above.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a server, a charging station, etc.). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for an electric vehicle charging station to dynamically respond to power limit messages, wherein the electric vehicle charging station includes a set of one or more charging ports, each of which may connect an electric vehicle to the electric vehicle charging station for charging service, the method comprising:
   receiving a message that indicates a request to limit an amount of power to an identified percentage, wherein the message is applicable to one or more of the set of charging ports; and
   for each of the set of charging ports that the message is applicable, performing the following:
     based on a history of power provided through that charging port over a period of time, causing the amount of power that is capable of being provided through that charging port to be limited according to the identified percentage.

2. The method of claim 1, wherein the history of power provided through the charging port over the period of time is an average of power samples collected during the period of time, each power sample representing a respective sampled amount of power.

3. The method of claim 2, wherein the power samples are collected by the electric vehicle charging station prior to receiving the message.

4. The method of claim 2, wherein the power samples are collected by an external entity coupled with the electric vehicle charging station.

5. The method of claim 1, wherein the history of power provided through the charging port over the period of time is calculated by an entity external to the electric vehicle charging station, and wherein the electric vehicle charging station receives the calculated history of power.

6. The method of claim 1, wherein causing the amount of power that is capable of being provided through that charging port to be limited according to the identified percentage includes preventing power from being provided upon determining that the identified percentage is lower than a minimum power value for charging.

7. The method of claim 1, further comprising:
   responsive to receiving a message that indicates that limiting the amount of power to the identified percentage has ended, causing the limit to be removed.

8. The method of claim 1, wherein the message is received from a demand response automation server (DRAS).

9. A non-transitory computer-readable storage medium that provides instructions that, if executed by a processor of an electric vehicle charging station, will cause said processor to perform operations comprising:

receiving a message that indicates a request to limit an amount of power to an identified percentage, wherein the message is applicable to one or more of the set of charging ports; and for each of the set of charging ports that the message is applicable, performing the following:

based on a history of power provided through that charging port over a period of time, causing the amount of power that is capable of being provided through that charging port to be limited according to the identified percentage.

10. The non-transitory computer-readable storage medium of claim 9, wherein the history of power provided through the charging port over the period of time is an average of power samples collected during the period of time, each power sample representing a respective sampled amount of power.

11. The non-transitory computer-readable storage medium of claim 10, wherein the power samples are collected by the electric vehicle charging station prior to receiving the message.

12. The non-transitory computer-readable storage medium of claim 10, wherein the power samples are collected by an external entity coupled with the electric vehicle charging station.

13. The non-transitory computer-readable storage medium of claim 9, wherein the history of power provided through the charging port over the period of time is calculated by an entity external to the electric vehicle charging station, and wherein the electric vehicle charging station receives the calculated history of power.

14. The non-transitory computer-readable storage medium of claim 9, wherein causing the amount of power that is capable of being provided through that charging port to be limited according to the identified percentage includes preventing power from being provided upon determining that the identified percentage is lower than a minimum power value for charging.

15. The non-transitory computer-readable storage medium of claim 9, wherein the non-transitory computer-readable storage medium further provides instructions that, if executed by the processor, will cause said process to perform operations comprising:

responsive to receiving a message that indicates that limiting the amount of power to the identified percentage has ended, causing the limit to be removed.

16. The non-transitory computer-readable storage medium of claim 9, wherein the message is received from a demand response automation server (DRAS).

17. An apparatus, comprising:

an electric vehicle charging station including:

a charging port configured to electrically connect to an electric vehicle to provide power to charge that electric vehicle;

a power control unit coupled with the charging port, the power control unit configured to control an amount of power provided through the charging port; and a set of one or more charging station control modules that are configured to perform the following:

in response to receipt of a message that indicates a request to limit the amount of power to an identified percentage and based on a history of power provided through the charging port over a period of time, cause the power control unit to limit the amount of power provided through the charging port to the identified percentage.

18. The apparatus of claim 17, wherein the electric vehicle charging station further includes a power sampling unit that is configured to periodically sample power provided through the charging port when charging of the electric vehicle is ongoing and prior to receipt of the message.

19. The apparatus of claim 18, wherein set of charging station control modules calculate the history of power based on an average of the power samples.

20. The apparatus of claim 17, wherein the receipt of the message is received from a demand response automation server (DRAS).

* * * * *